May 30, 1961  B. D. LEE  2,986,638
PROSPECTING USING GAMMA RAY DETECTION
Filed Jan. 18, 1955  2 Sheets-Sheet 1
Fig. 1.
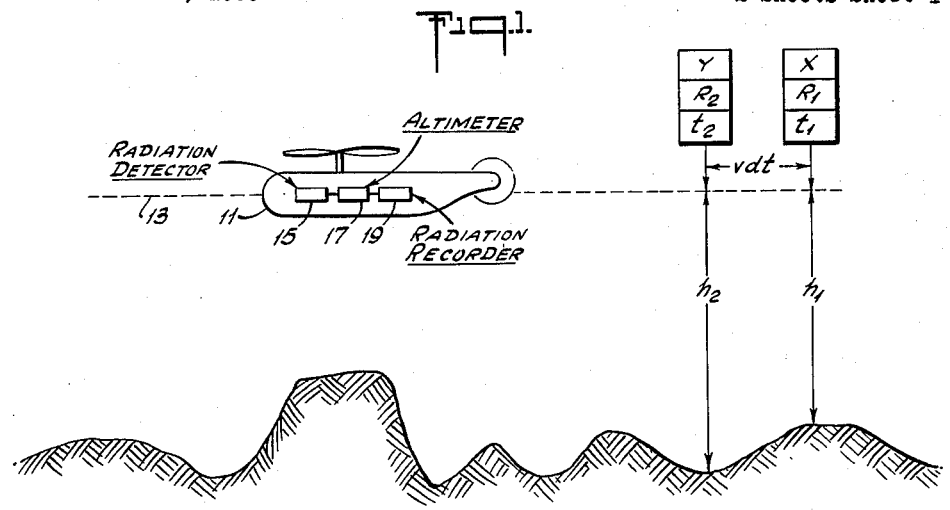
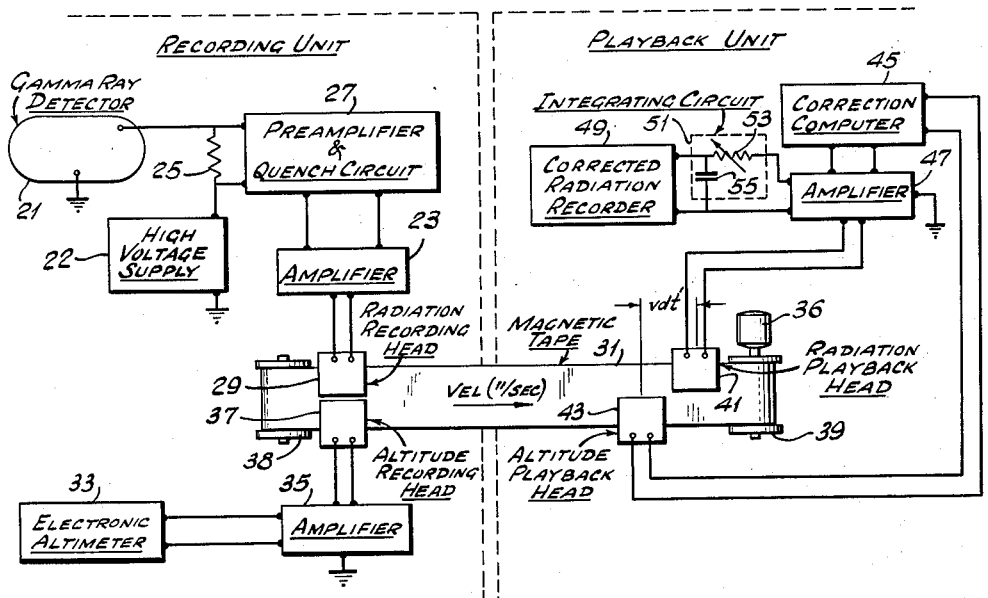
Fig. 2.

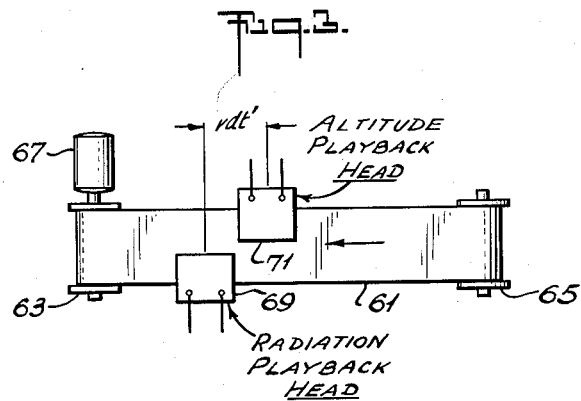
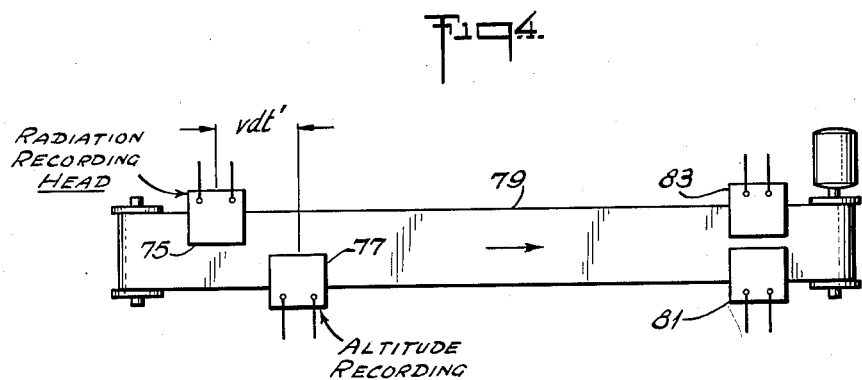

2,986,638

PROSPECTING USING GAMMA RAY DETECTION

Burton D. Lee, Houston, Tex., assignor to Texaco Inc., a corporation of Delaware Filed Jan. 18, 1955, Ser. No. 482,529

10 Claims. (Cl. 250—83.6)

This invention relates to obtaining correct data in situations wherein two variables are recorded simultaneously, a first variable being primary data, and a second variable being a parameter proportional to a third variable which has affected the value of the first or primary data variable; for example, any system wherein a time lag is inherent in the derivation of a correction to be applied to the basic data.

More particularly, my invention is concerned with geophysical prospecting, and especially with geophysical surveys involving the detection of variations in the intensity of gamma rays emanating from different points or zones on an earth surface. The invention provides improvements in methods and apparatus for this purpose, and is particularly useful in geophysical surveys employing airborne gamma ray detectors.

As disclosed in U.S. Patent 2,562,914, it is possible to discover radioactive anomalies indicative of the presence of ore bodies, petroleum deposits, and geological features such as faults, contacts, intrusions, etc., with gamma ray detectors of high efficiency. Thus, it has been discovered that ore bodies or petroleum deposits which are so deeply buried that gamma radiation, if any, is substantially completely absorbed by the overburden, may still be discovered by measuring differences in the intensity of gamma radiation originating close to the surface in the overburden itself. In other words, the presence of a body which is in itself not substantially radioactive (or if radioactive is so deeply buried that radiation originating therein is so completely absorbed by the overburden that it does not serve to reveal the body) may still be detected by faint radioactivity in the barren overburden. Moreover, the differences in intensity which are noted when passing from one geological formation to another across a fault or contact are of great aid in geological mapping.

Given a detector of adequate size and efficiency, significant differences in gamma ray intensities along a traverse on the earth's surface may be detected even though the detector is several hundred feet in the air above the surface and is carried along the traverse at a high velocity such as 30 miles per hour by an aircraft. Consequently, large scale geophysical surveys can be made rapidly and efficiently with air borne instruments, for example, a high efficiency gamma ray detector carried in a helicopter.

In carrying out such a survey it is desirable that the detector be flown along the traverse while maintaining a constant elevation above ground, for the intensity of observed radiation varies mathematically as an inverse function of the distance from the surface, as is well known in the art. Gamma radiation surveys of the type under consideration find much application in prospecting for deposits of metallic minerals, for example, ore bodies of copper, lead, iron, etc., but these unfortunately generally occur in mountainous terrain where the relief is such that it is difficult to fly a traverse maintaining even approximately a constant elevation above ground. If the elevations of the instrument and of the surface along the course of the traverse above sea level are known, it is possible to correct the observed intensities for the differences of elevation. Such an expedient however, is tedious and may require extensive topographical mapping since a surface profile must be run along each traverse and the elevation of the instrument for each reading must be determined.

As shown in U.S. Patent 2,617,945, the foregoing difficulties may be partially eliminated by automatically correcting the observed gamma ray intensity for changes in elevation of the detector, so that all radiation readings are based on a selected constant elevation above the adjoining portions of the earth's surface. In that patent the invention includes apparatus for measuring gamma radiation from the earth combining a gamma ray detector, an indicator for registering the intensity of the gamma rays, an altimeter, and means for automatically varying the response of the radiation intensity indicator in accordance with changes in elevation detected by the altimeter to indicate the true corrected radiation. Such correction is based on well known mathematical formulae defining the relation between observed radiation intensity and distance from a source of radiation.

While the invention of the foregoing patent constituted an important step ahead in the art, it has been found that complete accuracy of corrected gamma ray radiation measurements was not obtained. This was because there is some difficulty in applying the altitude variation correction due to unavoidable delay caused by time constants of the correction computing circuit, which results in correction being made too late. That is, the required correction to radiation R1 observed at a time $t1$ is not applied until a later time $t2$ equal to $(t1+dt)$, when the radiation detector then has traveled a distance $vdt$ and is measuring radiation R2, the lag being of the order of 1-2 seconds and being readily determinable for any given circuit.

In accordance with the present invention, compensation is made for the unavoidable delay caused by known time constants of the correction computing circuit, and the true corrected radiation measurements are obtained. This improvement is accomplished by simultaneously but separately making playable recordings of signals proportional to radiation intensity and signals proportional to height, playing back the recordings simultaneously in time-spaced relationship proportional to the time $dt$ normally between gamma radiation signals and altitude signals in the correction circuit for a given position of the aircraft, to bring the signals into step with one another timewise. Radiation intensity is then corrected in accordance with variations in the height of the aircraft by modifying the signals from playing back the radiation recording by the signals from playing back the altitude recording.

The radiation intensity and altitude signals can be both recorded and played back during the flight of the aircraft, to give accurately corrected true radiation readings for each position of the aircraft. Alternatively, the recording of signals can be made in the aircraft, and the playback accomplished by separate equipment after return of the aircraft to the ground.

Also in accordance with the invention, suitable novel apparatus is provided for performing the method described briefly above, as will be described in detail hereinafter.

For illustration, the principles of the invention have been described above as specifically applied to prospecting. It is apparent, however, that these principles are much more broadly applicable in many other fields. Thus, the invention in its broader aspects comprises a method for automatically correcting any observable primary data which has been affected in value by a simultaneously operating observable variable of any type. In performing this method, a playable recording is made of signals proportional to the observed uncorrected values of primary data, and simultaneously there is made a playable recording of signals proportional to the variable. Then the recordings are simultaneously played back in reverse order to the effective relationship between the primary data and the variable, for computation of the correction due to the variable, and for application of the correction to the primary data, to bring the recordings into step with one another. The primary data then is corrected in accordance with variations in the variable by modifying the signals from playing back the primary data recording, by the signals from playing back the variable recording.

The above and other aspects of the invention will be more thoroughly understood in the light of the following detailed description, having reference to the accompanying drawings in which:

Fig. 1 is a diagram illustrating how a survey is conducted in accordance with the present invention, employing an airborne detector and altimeter;

Fig. 2 is a block diagram of apparatus and electrical circuits for the practice of the invention;

Fig. 3 is a schematic plan view of an arrangement of apparatus for playing back signal recordings after return of an aircraft to earth; and Fig. 4 is a schematic plan view of a modified arrangement of apparatus for both recording and playing back signals in the aircraft.

Referring to Fig. 1, an aircraft 11 such as a helicopter is shown flying along a line of traverse 13 which may vary in elevation both with respect to a level datum plane and with respect to the earth's surface.

The gamma ray intensity is measured by a radiation detector 15 in the aircraft. Simultaneously, the height of the radiation detector above the earth's surface is measured by an altimeter 17 in the aircraft. A recorder 19 for true corrected radiation intensity is also provided in the control circuit from the radiation detector and altimeter.

The altimeter determines the vertical distance of the detector above the ground level and preferably is of the electronic echo ranging type which produces an output potential or signal that varies with the distance above the ground level. The control circuit may be of the types used for automatic volume control in radio receivers, and is designed to vary the amplitude of the radiation intensity observed by the recorder to compensate for changes in elevation above ground. Thus, as the elevation changes the radiation intensity amplitude is automatically corrected continuously.

Operating instructions for suitable conventional electronic echo-ranging altimeters can be found in Army-Navy Manual:

AN–08—10–265

A.P. 2582A

With further reference to Fig. 1, I have discovered that when the aircraft 11 is at a position X such that the elevation above the earth's surface is $h1$, the observed radiation intensity $R1$ at the time $t1$ is measured by the detector 15. Simultaneously, the height $h1$ is measured by the altimeter 17 but, due to a lag in the correction computing circuit, the correction of observed radiation intensity by a factor due to the height $h1$ is not applied until the aircraft has advanced a distance $vdt$ to a position Y where detector 15 is then measuring radiation $R2$. At time $t2$ when the height of the detector above the earth's surface is $h2$ it is obvious that error would be introduced if radiation $R2$ were to have applied thereto the correction due to height $h1$.

A clear understanding of the instrumentation involved in the practice of the invention will be gained from Fig. 2. The apparatus there illustrated comprises a gamma ray detector 21 which may be a conventional Geiger-Mueller counter, a scintillation counter, or a high efficiency detector such as disclosed in U.S. Patent 2,397,071.

The radiation detector 21 is connected across a D.C. high voltage supply 22 through a resistance 25 and ground.

An electronic preamplifier 27 is connected across the resistance 25 and, if desired, may have a quench circuit incorporated therein.

The detection of a gamma or cosmic ray by the detector results in a discharge in the counter and a consequent sudden voltage drop across resistance 25, thus producing a voltage pulse for each event counted. These individual pulses are amplified and shaped in preamplifier 27 and amplifier 23. The output of amplifier 23 is connected to magnetic recording head 29 which imposes a magnetic pulse on the moving recording tape 31 for each event.

Concurrently, altimeter 33 output which is in the form of a variable frequency alternating current, is applied through amplifier 35 to recording head 37 which produces a record of the altimeter output on the moving recording tape 31 on a track parallel to that produced by recording head 29.

Electronic altimeter 33 may be of the echo-ranging type having an output signal, the frequency of which varies in proportion to its distance above the ground, although this is not necessarily a linear function. For compensation purposes an output potential is required which varies inversely as the effect of altitude on gamma ray intensity at detector height. This is obtained by feeding the output of the altimeter 33 into an amplifier 35 having the proper characteristics.

As shown in Fig. 2, the heads 29 and 37 are arranged side-by-side and aligned with one another in a direction normal to a single wide thin tape. Other relative positions can also be employed, as will be described hereinafter. Also, two separate but coordinated records may be used, such as tapes or wires.

Magnetic tape 31 can be of any conventional commercially available type such as a cellulose plastic tape coated with magnetic iron oxide. As the signals are recorded on the tape a motor 36 operates to draw tape off a reel 38 onto a reel 39 to cause the recording heads 29 and 37 to record their signals on successive portions along parallel longitudinally extending paths on the tape.

Compensation for lag in altitude reporting is accomplished by placing a pair of magnetic play-back heads, 41 for radiation and 43 for altitude, adjacent tape 31 at a position remote from heads 29 and 37, and near the reel 39, to receive signals from the tape and transmit them through an electronic compensating system. Playback heads 41 and 43 are longitudinally spaced from one another lengthwise of the tape by a distance $vdt$ proportional to the previously determined time lag in the correction circuit between the radiation and altitude signals, so that radiation play-back head 41 is playing back signals such as $R1$ at the time that altitude play-back head 43 is playing back signals corresponding to $h2$. The offset between heads 41 and 43 may be adjusted as necessitated by the characteristics of a given circuit.

Compensation is accomplished by feeding the output of the altitude play back head 43 into a correction computer 45 which has the necessary characteristics and whose output potential varies as required to control the output of an amplifier 47.

The radiation play back head 41 is connected to amplifier 47 which in turn is connected to an electronic voltmeter or recorder 49, which indicates gamma ray intensity corrected for variations in height of the aircraft. Amplifier 47 includes an automatic volume control circuit whereby the output of the amplifier can be varied in accordance with the output of correction computer 45. Thus, the output of computer 45 operates the automatic volume control circuit of amplifier 47 to vary the amplitude of intensity registered by recorder 49 and compensate for changes in the elevation above the ground. This is an electronic multiplying operation.

An integrating circuit 51 consisting of a variable resistance 53 coupled with a condenser 55 is connected between the amplifier 47 and the recorder 49. The resistance 53 is variable, and by adjusting it the time constant of the integrating circuit may be varied, i.e. it may be made to average potentials over a longer or shorter period.

Other factors being equal, the uncorrected observed intensity decreases as the distance of the detector 21 above the ground is increased. However, the electronic altitude indicator is carried with the detector at approximately the same elevation, its output potential being proportional to a function of the distance above ground. This potential feeds the correction computing system so that substantially perfect compensation may be achieved with the result that the gamma ray intensity of the earth along the traverse being followed is shown by recorder 49 as though the detector were being flown at a constant elevation above adjoining areas of the ground.

The system described in connection with Fig. 2 is one wherein both recording and play-back are performed within the aircraft during its flight. However, in order to reduce the bulk and weight of the equipment, it is often advantageous to divide the system into separate recording and play-back parts. The former is carried in the aircraft and produces a record on the magnetic tape, which is later brought to earth with the plane after completion of a traverse. As shown in Fig. 3, such a tape 61 is brought to earth on a reel 65, and during play-back is wound up on a reel 63 rotated at constant speed by a motor 67. A radiation play-back head 69 and a altitude play-back head 71 are positioned adjacent to the tape 61 in longitudinally spaced relationship to one another, the longitudinal distance $vdt'$ between heads being proportional to the time lag in the altitude correction system. Play-back heads 69 and 71 have their outputs connected through an amplifying and recording system identical to that described in connection with Fig. 2.

Referring to Fig. 4, it is also possible to obtain signal recordings correcting the time lag by positioning the radiation recording head 75 and the altitude recording head 77 adjacent to the tape 79 in the aircraft in longitudinally spaced relationship to one another, instead of in alignment with one another normally of the tape. The distance $vdt'$ between the heads again is proportional to the time lag in the correction system. In this modification, the play-back heads 81 and 83 are positioned in alignment with one another normally of the tape 79, either in the aircraft or later when the tape is returned to earth (as in Fig. 3).

It is evident that the same results can also be achieved by combinations of spacings, as by spacing heads 75, and 77 apart by $vdt'/2$, and heads 81 and 83 by the same amount, without departing from the principles of the invention.

The foregoing description has been based on the use of an altimeter correction computing circuit which lags behind the radiation detector circuit in time. It is evident, however, that the same principles also will apply in a converse situation. Then the recording and play-back heads will be positioned conversely to the described positions so as to bring the lagging radiation detector signals into step with the leading altimeter signals.

Obviously, many modifications and variations of the invention as hereinbefore set forth may be made without departing from the spirit and scope thereof and only such limitations should be imposed as are indicated in the appended claims.

I claim:

1. In a method of prospecting by flying an aircraft over the surface of the earth while detecting radiation emanating therefrom and while also automatically measuring the altitude of said aircraft above said surface, the improvement which comprises making a reproducible recording of signals proportional to radiation intensity, simultaneously making a reproducible recording of signals proportional to altitude, simultaneously reproducing said two recorded signals in time displaced relationship such that the time lag of the signal corresponding to the radiation lags behind the signal proportional to altitude by a predetermined amount corresponding to the characteristic time delay of a given computing apparatus, applying the signal corresponding to altitude to said computing apparatus in order to derive a correction factor, and subjecting the signal corresponding to detected radiation to said correction factor in order to provide a corrected indication of the radiation emanating from the earth.

2. A method for automatically correcting observable primary data which has been affected in value by a simultaneously operating observable variable, said method comprising making a reproducible recording of a signal which is a known function of the observable primary data, simultaneously making a reproducible recording of a signal which is a known function of the observable variable, reproducing the observed variable signal, applying the reproduced signal to a correction computing circuit having a given time delay to derive a correction factor signal, reproducing the primary data signal in time displaced relationship such that there is a time lag in the reproduction of the primary data signal with respect to the reproduction of the variable signal equal to the given time delay of the correction computing circuit and combining the correction factor signal and the reproduced primary data signal to provide corrected primary data.

3. A method as set forth in claim 2 which includes making both of said recordings on parallel tracks on a single tape at positions aligned with one another normally of said tape.

4. Apparatus for automatically correcting observable primary data which has been affected in value by a simultaneously operating observable variable which comprises first means for recording a signal which is a function of the primary data, second means for simultaneously recording a signal which is a function of the observable variable, first means for reproducting the recorded observable variable signal, computing means having a delay therein of a given time interval, means for applying the reproduced signal to said computing means, second means for reproducing said recorded primary data signal at a time equal to said given time interval after said recorded observable variable signal is reproduced, means for combining the output signals from said primary data signal reproducing means and said computing means and means for recording the combined signals from the output of said combining means.

5. Apparatus as set forth in claim 4 wherein said first and second recording means comprise a single recording tape adapted to travel at a given velocity and first and second recording heads, respectively, arranged to make primary data signal recordings and observable variable signal recordings on parallel tracks on said tape at positions aligned with one another normally of said tape.

6. Apparatus as set forth in claim 5 wherein said first and second reproducing means includes first and second play back heads, respectively, arranged adjacent said parallel track on said tape at positions spaced from one another lengthwise of said tape by a distance equal to said time interval multiplied by said tape velocity.

7. Apparatus as set forth in claim 5 wherein said first and second recording means includes a single recording tape traveling at a given velocity and first and second recording heads, respectively, arranged to make primary data signal recordings and observable variable signal recordings on parallel tracks on said tape at positions spaced from one another lengthwise of said tape by a distance equal to said time interval multiplied by said given velocity.

8. Apparatus as set forth in claim 7 wherein said first and second reproducing means comprises first and second play back heads, respectively, arranged adjacent said parallel tracks on said tape at positions aligned with one another normally of said tape.

9. Apparatus for measuring gamma radiation from the earth during an aerial traverse over the earth's surface comprising, in combination, a detector for gamma radiation, a first amplifier connected to the output of said detector, a first recording head connected to the output of said first amplifier, an altimeter for automatically determining the height of said detector above the earth's surface, a second amplifier connected to the output of said altimeter, a second recording head connected to the output of said second amplifier, record means in position to have recorded thereon at a given velocity by said first and second heads playable recordings of signals proportional to altitude and radiation intensity, a first play back head disposed in spaced relationship to said first recording head to play back recordings of the signals proportional to gamma radiation, a second play back head disposed in spaced relationship to said second recording head to play back recordings of signals proportional to altitude, a third amplifier connected to the output of said first play back head, indicating means connected to the output of said third amplifier and means connected to said second play back head and to said third amplifier for automatically varying the output of said third amplifier and the response of said indicating means as the distance of said radiation detector from the earth's surface varies, said output varying means having a time delay of a given time interval, said first heads being separated by a distance greater than the distance separating said second heads, the difference in distances being equal to the product of the given time interval and the recording means velocity.

10. In apparatus for measuring gamma radiation from the earth during an aerial traverse with an aircraft over the earth's surface, the combination comprising a first playable recording of signals proportional to radiation intensity at said aircraft, a second playable recording of signals proportional to the altitude of said aircraft recorded simultaneously with the recording of said radiation intensity signals, means for reproducing the signals proportional to altitude, means for deriving a signal representing a correction factor from the reproduced altitude signal, said altitude correction signal deriving means having an inherent signal time delay of a given length of time, means for reproducing the signals proportional to radiation intensity at a time equal to said given length of time after the corresponding altitude signals from said altitude signal reproducing means are reproduced, means for combining the altitude correction signal and the reproduced radiation signal and means for recording the resultant signal from said signal combining means.

References Cited in the file of this patent

UNITED STATES PATENTS

| | | |
|---|---|---|
| Re. 24,641 | Reynolds | Apr. 28, 1959 |
| 2,394,990 | Eisler | Feb. 19, 1946 |
| 2,424,281 | Begun | July 22, 1947 |
| 2,521,623 | Arndt | Sept. 5, 1950 |
| 2,617,945 | Lord | Nov. 11, 1952 |
| 2,685,027 | Alvarez | July 27, 1954 |
| 2,685,079 | Hoeppner | July 27, 1954 |
| 2,712,609 | Herzog | July 5, 1955 |
| 2,761,977 | McKay | Sept. 4, 1956 |
| 2,800,639 | Lee | July 23, 1957 |
| 2,827,572 | Blanchard | Mar. 18, 1958 |
| 2,878,321 | Davis | Mar. 17, 1959 |
| 2,881,325 | Hendee et al. | Apr. 7, 1959 |
| 2,907,002 | Smith et al. | Sept. 29, 1959 |